United States Patent [19]

Lawton

[11] Patent Number: 4,911,089
[45] Date of Patent: Mar. 27, 1990

[54] METHOD OF AND MEANS FOR POSITIONING ROOT CONTROL BAGS

[75] Inventor: Peter A. Lawton, Berwick, Australia

[73] Assignee: Ronneby Tree Farm Pyt. Ltd., Reservoir, Australia

[21] Appl. No.: 368,817

[22] Filed: Jun. 20, 1989

[30] Foreign Application Priority Data

Jun. 21, 1988 [AU] Australia .................................. PI8903

[51] Int. Cl.$^4$ ............................................. A01C 11/02
[52] U.S. Cl. ......................................... 111/113; 111/158
[58] Field of Search .............. 111/101, 103, 106, 107, 111/112, 113, 114, 133, 158, 162, 919; 37/142.5; 405/179; 47/73, 76

[56] References Cited

U.S. PATENT DOCUMENTS

| | | | |
|---|---|---|---|
| 1,470,028 | 10/1923 | Parker | 37/142.5 |
| 3,294,046 | 12/1966 | Boots | 111/113 |
| 3,524,419 | 8/1970 | Middleton | 47/73 |
| 3,583,168 | 6/1971 | Horton | 37/142.5 |
| 3,618,329 | 11/1971 | Hanson | 405/179 |

FOREIGN PATENT DOCUMENTS

| | | | |
|---|---|---|---|
| 523044 | 4/1931 | Fed. Rep. of Germany | 405/179 |
| 1260048 | 3/1961 | France | 111/112 |
| 2383595 | 10/1978 | France | 111/113 |
| 641903 | 1/1979 | U.S.S.R. | 111/113 |

*Primary Examiner*—Danton D. DeMille
*Attorney, Agent, or Firm*—Stevens, Davis, Miller & Mosher

[57] ABSTRACT

The invention relates to a method of and a machine for substantially automatically positioning root control bags in the ground. The method includes the steps of excavating soil to form a trench, positioning root control bags, supported by formers, in the trench or an adjacent trench, and then filling the trench and the bags with soil excavated by the machine. After the bags have been filled the formers are extracted from the filled bags leaving the bags in an erect and filled condition within the filled trench. The invention extends to a machine for performing these operations, the machine including an excavator, bag positioning means, former extractions means, and soil conveying means for conveying soil excavated by the excavator to a position intermediate the bag positioning means and the extraction means. The various components of the machine can be automated to a greater or lesser extent.

15 Claims, 4 Drawing Sheets

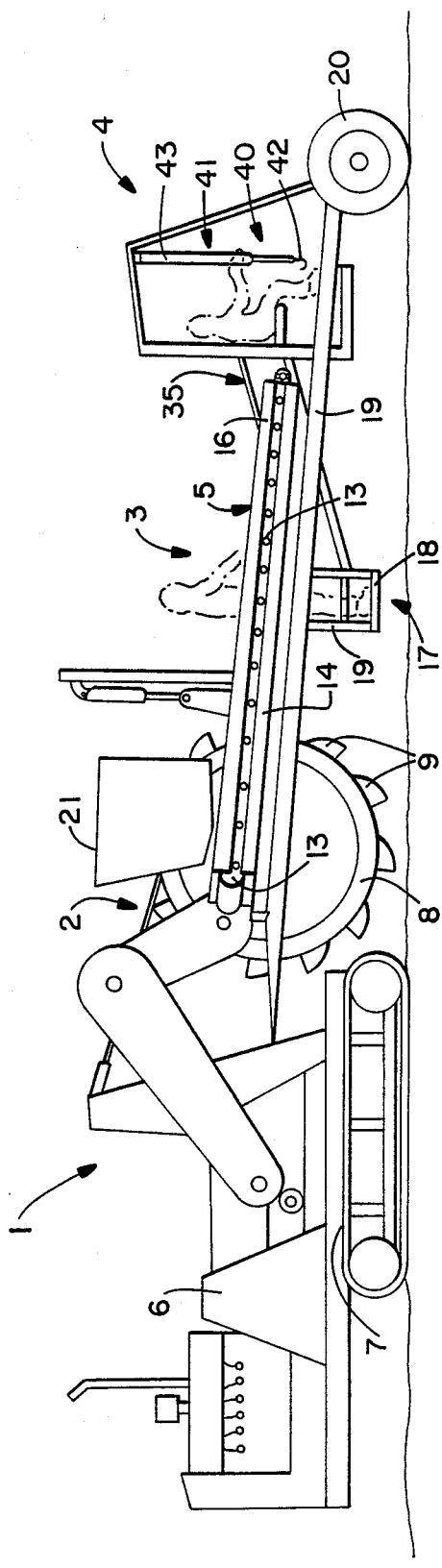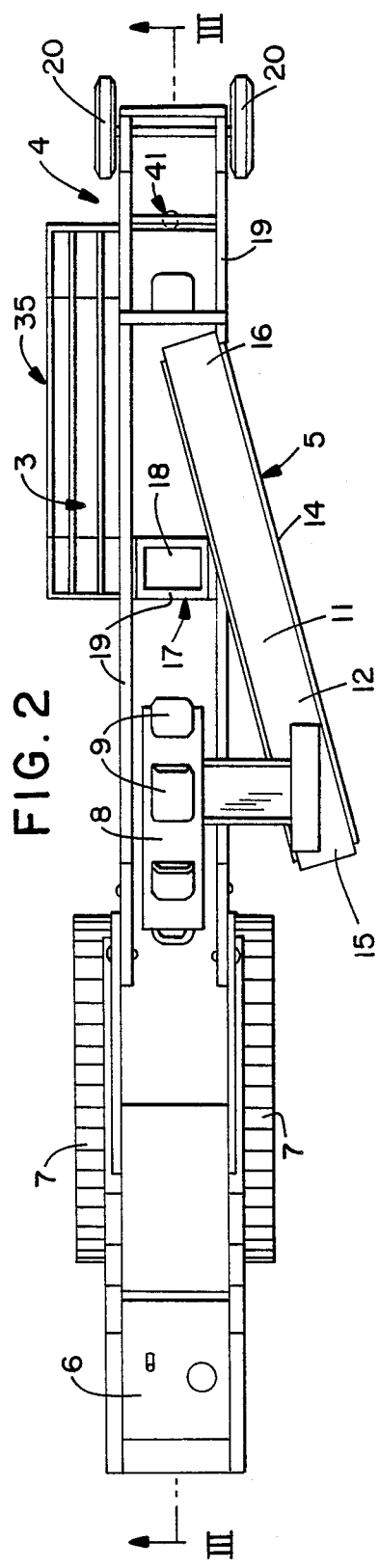

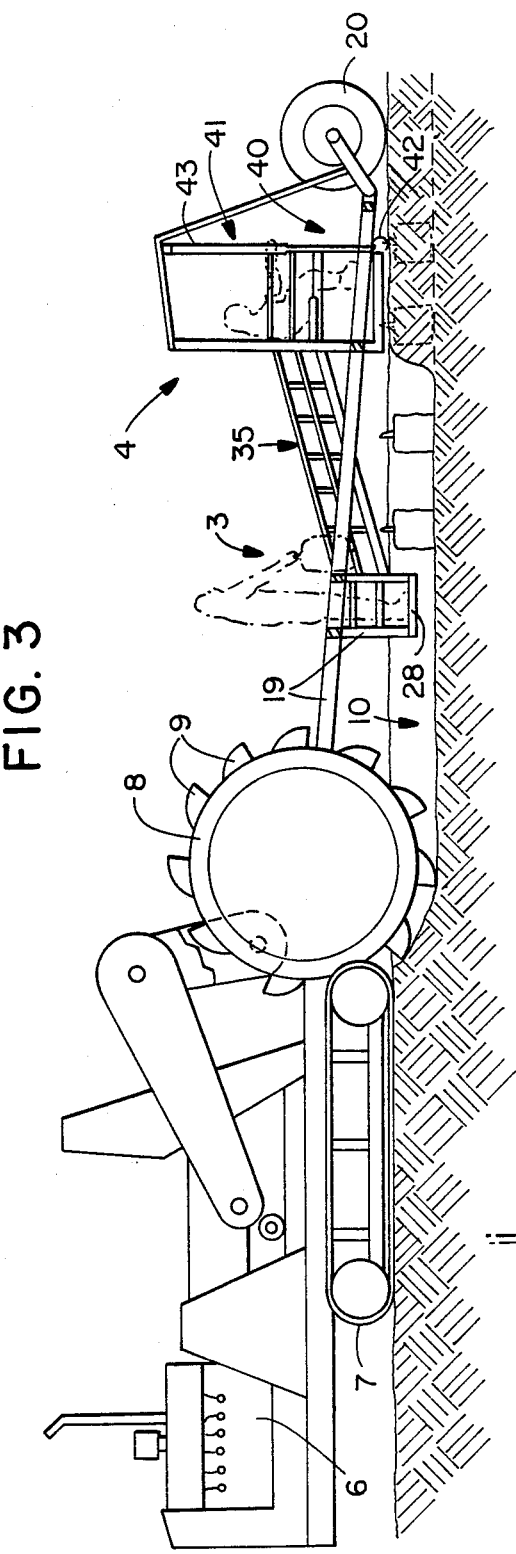
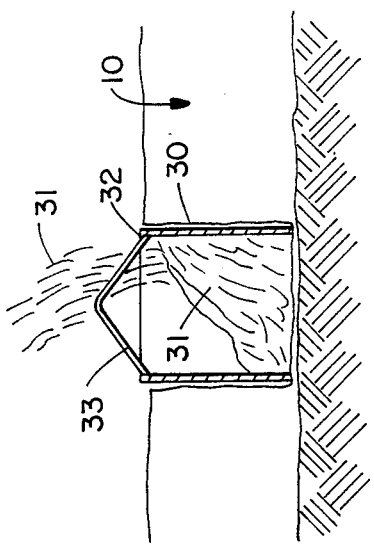
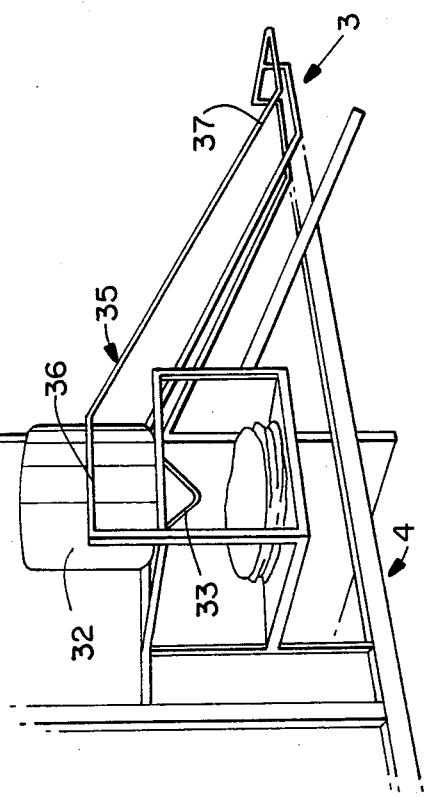
FIG. 3
FIG. 5
FIG. 4

METHOD OF AND MEANS FOR POSITIONING ROOT CONTROL BAGS

This invention relates to a machine for positioning root control bags in the ground so as to be ready to receive nursery stock or the like which are to be grown in the bags. The invention extends to a method of positioning the bags.

Root control bags of the type with which this invention is concerned are positioned below ground level in a hole prepared therefor and are subsequently filled with soil or other growing medium in which the seedlings may then be planted. The method is described in the specification of U.S. Pat. No. 4,574,522. The term "root control bag" will be used in this specification to describe bags of the type described in U.S. Pat. No. 4,574,522.

The cultivation of nursery stock in root control bags should be conducted on an extensive scale in order to be economically viable. To reduce labour costs the ground can be prepared using a mechanical excavator. Prior art methods have included either an auger method wherein circular holes are formed having a diameter substantially the same as the root control bag, or a trenching method in which a trench is excavated which has a width substantially the same as the diameter of the bag. The bags are then positioned within the trench excavation by hand.

It is important that the bag be free of folds after filling with growing medium as the folds tend to cause breakup of the contained root body at the time of replanting. For this reason, and also for simplicity of bag filling, a former is generally employed to hold the bag erect and in position during the filling process. The former is conveniently of hollow open ended right circular cylindrical shape having a diameter which is slightly less than that of the bag and is located within the bag so that it holds the bag erect and holds the mouth of the bag open, ready for filling with growing medium. After the bag has been filled with growing medium the former is lifted out of the bag leaving the bag in the excavated hole or trench filled with growing medium. The growing medium is usually soil, possibly with suitable additives mixed therein.

The aforementioned steps of forming the excavation, positioning the bag and former, filling the bag, and extracting the former are labour intensive and time consuming operations which add to the cost of producing nursery stock.

It is an object of the invention to provide a method of and means for substantially automatically positioning root control bags.

According to a first aspect of the invention there is provided a method of locating root control bags in position in the ground and filling the bags with a suitable growing medium, said method including the steps of:

excavating soil from the ground with a mechanical excavator to form a trench,
depositing the excavated soil on conveying means,
positioning a root control bag on a former in the trench or a previously excavated trench adjacent to the trench,
conveying excavated soil with the conveying means to the trench where the bag and former are located,
filling the bag and former and the trench in which the bag is located with excavated soil, and
extracting the former from the trench leaving behind the filled bag in position in the trench.

According to a second aspect of the invention there is provided a machine for positioning root control bags in the ground, said machine comprising a mechanical excavator suitable for excavating a trench, a conveying means for conveying soil excavated by said excavator to a position remote from said excavator, a series of formers suitable for holding root control bags in position within a trench excavated by said excavator, former and bag positioning means for positioning formers with bags thereon in a trench excavated by said excavator, lifting means for lifting said formers out of the ground, said conveying means being adapted to deposit soil in a trench wherein said formers and bags have been positioned to thereby fill said trench and said bags with soil, said lifting means being operative to lift said formers out of the ground once the bags have been so filled.

Two embodiments of the invention will now be described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings:

FIG. 1 shows a diagrammatic side view of a bag positioning machine according to the invention.

FIG. 2 shows a plan view of the machine depicted in FIG. 1.

FIG. 3 shows a cross-sectional side view of the machine along section line III—III shown in FIG. 2.

FIG. 4 shows an enlarged cross-sectional side view of the bag positioning and former extraction parts of the machine depicted in FIG. 1.

FIG. 5 shows a cross-sectional side view through a trench with a root control bag and its former located therein.

Figure 6:
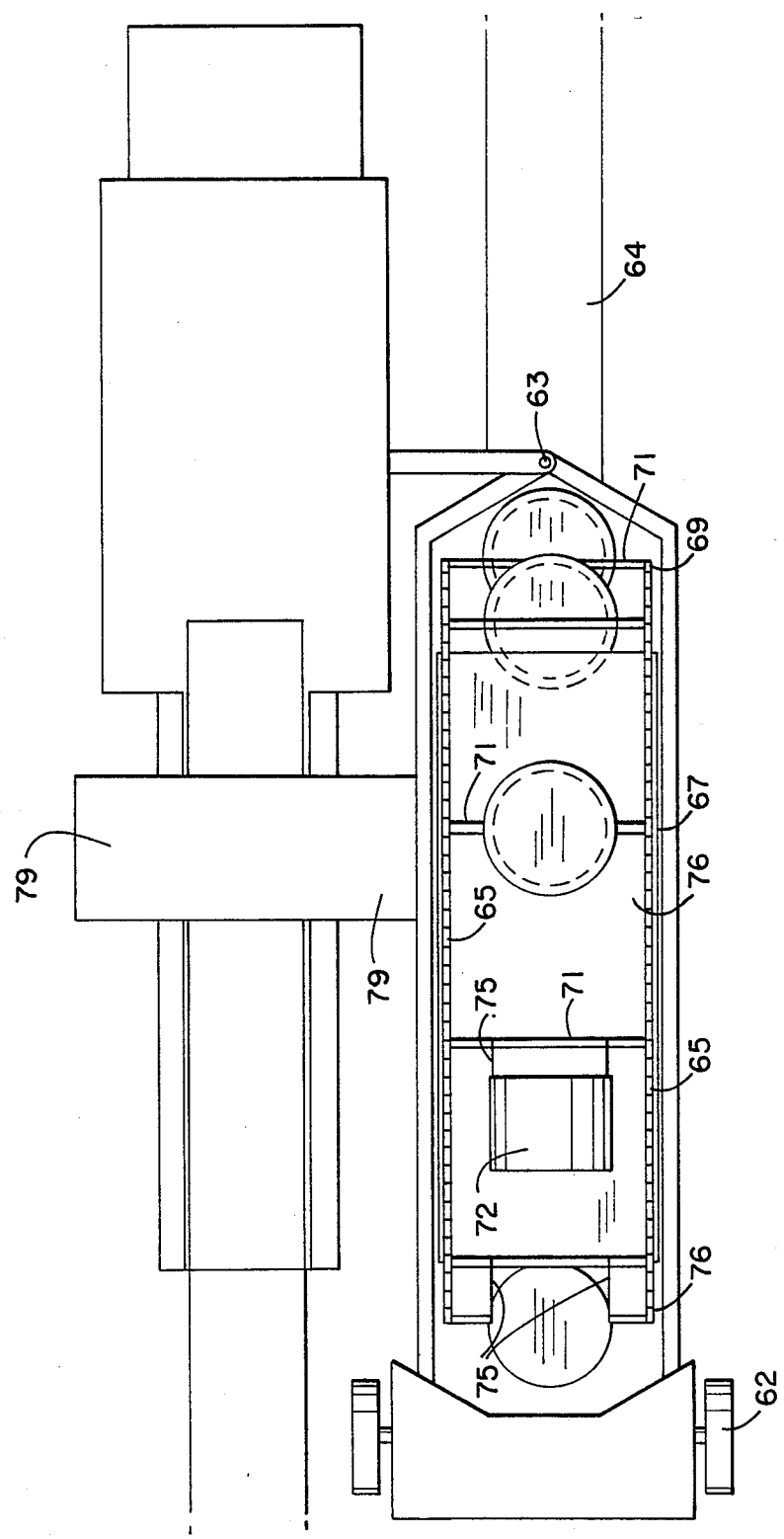
FIG. 6 shows a plan view of a second embodiment of the invention.

This invention is primarily concerned with positioning root control bags in the ground. As shown in FIG. 5, a root control bag 30 is located within a trench 10 to be filled with loose soil 31 or other growing medium and the bag temporarily is held in an erect, open mouth upwards, position by a former 32 which is conveniently a hollow open ended cylinder or drum. The former 32 preferably has a bracket 33 mounted to its upper end so that once the bag 30 has been filled with soil the former 32 can be pulled out of the bag 30, by pulling upwards on the bracket 33, with the weight of the soil 31 in the bag keeping the bag properly in position in the trench. The following portions of this specification describe two embodiments of the invention.

As depicted in FIGS. 1 to 4 of the drawings, a machine 1 for positioning root control bags in the ground includes a mechanical excavator 2, a former and bag positioning means 3, former extraction or lifting means 4, and soil conveying means 5. The different parts of the machine 1 are conveniently linked together so that a single prime mover 6 which is preferably mounted on the excavator is used to provide power as necessary for each of the parts, and is also used to drive the machine 1 along a required path. Each of the parts of the machine 1 will be described in more detail herebelow.

The excavator 2 can be of any suitable design and may conveniently be a vehicle mounted on tracks 7 behind which a rotary bucket excavator 8 is rotatably mounted. The bucket excavator 8 carries a plurality of buckets 9 each of which has a width which defines the width of the trench 10 to be excavated by the excavator. An excavator 8 of this nature is well known and will not be described herein in any greater detail.

The excavator 2 preferably lifts the soil 31 from the trench 10 being excavated and deposits the excavated soil 31 on the soil conveying means 5. That conveying means 5 is preferably a belt conveyor 11 having an endless belt 12 which runs on rollers 13 mounted on a substantially horizontal frame 14. The conveyor 11 has a loading end 15 and a discharge end 16, the loading end 15 being located adjacent the excavator 2 and the arrangement is such that soil 31, excavated by the excavator, is deposited into a hopper 21 and from the hopper 21 automatically on to the loading end 15. The discharge end 16 is located adjacent the trench 10 excavated by the excavator 2, at a position some distance behind the excavator 2. The conveyor 11 is preferably driven by a suitable chain and sprocket drive 21 which links the conveyor to the prime mover 6.

The bag positioning means 3 is situated on the machine 1 intermediate the excavator 2 and the discharge end 16 of the conveyor 11. The bag positioning means 3 may be an automated apparatus for automatically positioning the root control bags 30 and the former 32 in position in the trench 10, or it may simply be a station 17, as depicted in FIGS. 1 to 4, whereon an operator can be positioned for manually positioning the bags and formers in the trench 10. The station 17 of this embodiment comprises a platform 18 which is in line with the excavator 2 and is mounted on a frame 19 which is towed behind the excavator 2. The frame 19 is supported at its rear end on a pair of wheels 20 which stradle the trench 10 formed by the excavator. The platform 18 is supported on the frame 19 at an elevation which is below ground level. The width of the platform 18 is less than the width of the trench 10 formed by the excavator so that the operator is situated at a relatively low position within the trench and is therefore able to position the bags 30 and formers 31 in the trench 10 without difficulty.

Where a manual bag positioning means 3 is used it is necessary to have a device for returning formers from the former extraction or lifting means 4 to the bag positioning means 3. This device may conveniently comprise a sloping guide 35 having a high point 36 adjacent the extraction means 4 and a low point 37 adjacent the bag positioning means 3. The sloping guide 35 preferably has side rails 38 for retaining formers 32 on the guide and for permitting formers to stack up prior to use. Whilst the formers are being moved from the extraction means 4 back to the positioning means 3 it will be necessary to fit bags 30 to the formers 32. This can be done manually by an operator who operates the former extraction means 4 so that the formers which slide down the sloping guide 35 do so with the bags 30 already fitted thereon.

The former extraction or lifting means 4 may take any suitable form but will have engagement means 40 for engaging the bracket 33 on the former, and lifting means 41 for lifting the former 32 out of the trench 10. The preferred arrangement is for the engagement means 40 to comprise a hook 42 which is configured to hook around the bracket 33. The hook 42 is located at the operatively lower end of a pneumatic piston and cylinder assembly 43 which is used to lift and lower the hook 42 in order to operate the extraction means 4. An operator may be situated on the extraction means 4 in order to operate the piston and cylinder assembly 43. It may be preferable for the operatively upper end of the piston and cylinder assembly 43 to be pivotally mounted to the frame 19 so as to allow the operator to tilt the assembly 43 in order to ensure the hook 42 engages the bracket 33 as the machine travels along the trench 10. The extraction means 4 will thus be provided with controls (not shown) for operating the assembly 43 so that the operator can selectively lift and lower the hook 42 as required. Clearly, it would be a simple matter to automate the extraction means 4 and in regions where labour costs are high this would be preferable.

The discharge end 16 of the conveyor 5 will discharge loose soil 31 into the trench 10 between the positioning means 3 and the extraction means 4. This will ensure that the bags 30 and trench 10 are filled by the loose soil 31 prior to the formers 32 being extracted by the extraction means 4. It will be possible to add fertilizers, herbicides or other additive to the loose soil 31 prior to the bags 30 and trench 10 being filled, and this can conveniently be done by continously discharging additive onto the conveyor 11 from some suitably positioned hopper (not shown).

Figure 7:
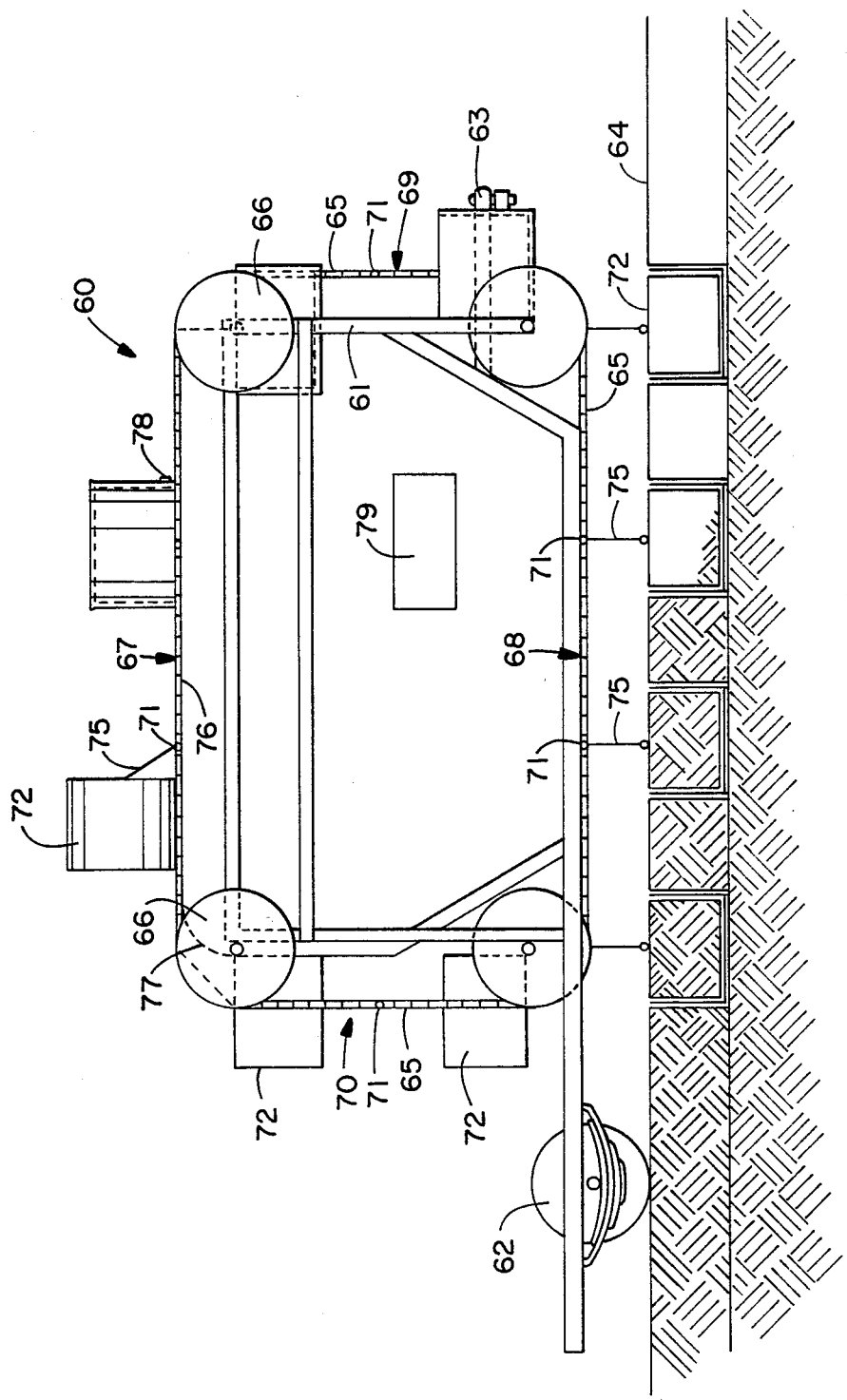
FIG. 7 shows a side view of the machine of FIG. 6.

Clearly, and as previously mentioned, it will be possible to automate both the bag positioning means 3 and extraction means 4. FIGS. 6 and 7 shows an embodiment in which these two means are automated.

The machine 60 shown in FIG. 6 includes a frame 61 which is of substantially rectangular elongate form and is supported off the ground on wheels 62 which are located towards the rear of the frame 61. The frame 61 has a hitch 63 fitted to the forward end thereof for pulling the machine 60 along a trench 64 in which root control bags are to be located. The wheels 62 may straddle the trench 64 so that the frame 61 is supported directly above the trench 64 and the length of the frame 61 lies in line with the trench 64. The frame 61 carries an endless chain, or preferably, a pair of endless chains 65 which run on parallel paths and are spaced apart by a set distance. The chains 65 are supported on sprocket wheels 66 mounted in pairs and carried by the frame. The sprocket wheels 66 have an axis of rotation which is substantially transverse to the length of the frame 61. The chains 65 may follow a path which includes an upper horizontal section 67, a lower horizontal section 68, and forward and rear vertical sections 69, 70 joining the two horizontal sections.

The two chains 65 are joined together by rods 71 the ends of which engage with individual chain links. The ends of those rods 71 are preferably configured so that they may be disengaged from the chain links and engaged with other chain links without difficulty to thereby provide a facility whereby the spacing between rods 71 may be varied. In one form of the invention for example, the chains 65 are 10 m long and 10 connecting rods 71 are provided at even spacing along the length of the chains 65 thus providing a spacing between rods 71 of approximately 1 m. Additional rods 71 may be introduced into the chain links and the spacing between rods 71 varied for different spacing configurations.

The formers 72 for supporting root control bags 73 during the filling thereof by loose soil 74 or other growing medium are preferably connected to the rods 71 which join the chains together. Any suitable connecting means 75 may join the formers 72 to the rods but in a preferred form of the invention that connecting means 75 is flexible, such as a wire, cable or the like. One former 72 may be connected to each rod 71 so that the total number of formers 72 is equal to the total number of rods 71, and the formers 72 are evenly spaced around the frame 61 along the path followed by the chains 65.

The upper horizontal section 67 of the chain path preferably has a smooth support surface 76 located directly below it on which the formers 72 slide as they are carried around the upper section of the path by the chains. The support surface 76 may be made from steel plate which is secured to the frame 61. The leading edge 77 of the support surface 76 preferably has a tapered or rounded form such that formers 72, as they are lifted on to the support surface 76, do not snag.

The chains 65 are driven by any suitable means (not shown). In one form of the invention one of the sprocket wheel pairs 78 is joined to the support wheels 62 so that rotation of those support wheels whilst the machine is towed along the trench 64 will cause the chains 65 to be driven along their circuitous paths. Preferably the drive is a direct drive and arranged so that the speed at which the chains 65 are driven matches exactly the speed at which the machine 60 is travelling over the ground. A suitable disengagement means will be provided for disconnecting the chains 65 from the drive means where necessary. The direction in which the chains are driven is such that the chains 65 travelling on the lower section 68 of the path are stationary relative to the ground. That is, the chains 65 on the lower section 68 are travelling at the same speed and in the opposite direction to the frame 65, and the consequent speed of the chains relative to the ground is zero.

In use, as the machine 60 is towed along a trench, the formers 72 which are connected to the rods 71 carried by the chains 65 will be positioned in the trench 64 at even spacing defined by the distance between rods 71 along the path of the chains 65. Only those formers 72 which are at any one time carried along the lower section 68 of the path will be within the trench 64 and those formers 72 will hang from their connection means 75 below the frame with their axes vertical. They will also be stationary within the trench 64 as there is no relative movement between the ground and the chains 65 travelling on the lower section 68 of the path.

The formers 72 carried on the upper section 67 of the chain path will slide along the support surface 76. On that surface root control bags 73 will be fitted over the formers 72 and secured to the formers 72. The formers 72 may be provided securing means 78 such as clips to secure the root control bags 73 or elastomeric bands may be used to ensure the bags do not inadvertently fall off the formers 72.

The securing means 78 must however be of a temporary nature so that the root control bags can slide off the formers and remain within the trench after they have been filled with soil 74 and the formers 72 are lifted out of the trench 64.

In one form of the invention the root control bags are automatically filled by soil 74 excavated in an adjacent trench by the excavating part 79 of the machine. That soil is conveyed by a transverse conveyor 80 to the trench 64 in which the root control bags 73 are positioned and the soil 74 fills the entire trench 64, including the interior of the root control bags 73 located in the trench 64. During this filling process the bags are held in their upright and erected position by the formers located therein. The conveyor 80 will thus preferably deposit soil 74 in the trench 64 at a position intermediate the forward and rear ends of the frame 61. In that position the bags 73 and formers 72 are resting on the bottom of the trench.

As the machine 60 is towed along the trench 64 the formers 72 will pass underneath the length of the frame 61 from the forward end thereof to the rear end. The chains 65 travelling up the rear section 70 of the frame 61 will lift each former 72 out of the trench 64 as the rear of the frame 61 passes over that former. When the former 72 is lifted it will be pulled out of the root control bag 73, the root control bag remaining in the trench due to the weight of the soil within the bag. Thus, as the former is lifted the former will slip out of the grip of the securing means 78 which holds the root control bag 73 to the former 72 and the bag 73 will remain in the ground in an upright but filled condition, ready to receive nursery stock to be grown within the bag 73.

The plant to be grown in the filled root control bag 73 may be planted in the bag 73 at any suitable time after it has been filled with soil. In one embodiment of the invention the plant is planted in the bag automatically after the bag has been filled by a planting device (not shown) which is coupled with the machine 60 and synchronised so as to ensure each plant is received in a corresponding bag 73.

The formers, after being lifted out of the ground travel up the rear vertical section 70 of the path and then on to the top horizontal section 67 of the path. A walkway (not shown) may be provided to one side of the frame and an operator operating from that walkway may fit the bags 73 to the formers 72 travelling on the support surface 76. Alternatively, a mechanical bag fitting device (not shown) may be fitted to the machine. Clearly the machine is designed to run on a continuous basis with the formers 72 travelling on the circuitous path without interruption.

The chains 65 and sprocket wheels 66 which carry the chains are preferably of a design which will ensure that no relative slippage between sprocket wheel 66 and chain 65 occurs. This will ensure that the two chains 65 are kept running at equal speeds and that the rods 71 connecting the two chains are kept perpendicular to the length of the chains. For this purpose, matched sprocket wheels 66 on opposite sides of the frame 61 may be linked together on a common axle 81 on which they are fixed, the axle 81 being mounted to the frame by suitable bearings (not shown). The sprocket wheels 66 preferably are of a form that allows the position of the rods 71 to the altered and it will be appreciated from the foregoing that the spacing of root control bags 73 along the length of the trench 64 depends on the spacing of the rods 71. It is thus preferred that a form of rod 71 and chain link be adopted that allows for relatively simple disengagement and engagement of the rods 71 with the links to thereby easily alter the spacing of rods 71 to thereby accomodate differing terrain conditions or plant types.

It is to be understood that various alterations, modifications and/or additions may be introduced into the constructions and arrangements of parts previously described without departing from the spirit or ambit of the invention as defined by the appended claims.

Having now described out invention what we claim as new and desire to secure by letters patent is:

1. A method of locating root control bags in position in the ground and filling the bags with a suitable growing medium, said method including the steps of:

excavating soil from the ground with a mechanical excavator to form a trench, depositing the excavated soil on conveying means, positioning a root control bag on a former in the trench, conveying excavated soil with the conveying means to the trench where the bag and former are located, filling the bag and former and the trench in which the bag is located with excavated soil, and extracting the former from the trench leaving behind the filled bag in position in the trench.

2. A method according to claim 1 wherein said mechanical excavator comprises a rotary bucket excavator and said excavated soil is deposited by individual buckets into a hopper which feeds the excavated soil onto said conveying means.

3. A method according to claim 1 wherein said step of positioning a root control bag and former within a trench is effected from apparatus towed by said mechanical excavator, said method including the steps of positioning a plurality of bags and formers at even spacings within said trench, operating said conveying means to deposit excavated soil continuously within said trench and operating said excavator on an uninterrupted basis for the filling of said plurality of bags.

4. A method according to claim 1 wherein the extracting of formers from filled bags is effected by apparatus towed by said mechanical excavator.

5. A machine for positioning root control bags in the ground, said machine comprising a mechanical excavator suitable for excavating a trench, a conveying means for conveying soil excavated by said excavator to a position remote from said excavator, a series of formers suitable for holding root control bags in position within a trench excavated by said excavator, former and bag positioning means for positioning formers with bags thereon in a trench excavated by said excavator, extraction means for lifting said formers out of the ground said conveying means being adapted to deposit soil in a trench wherein said formers and bags have been positioned to thereby fill said trench and said bags with soil, said extraction means being operable to lift said formers out of the ground once the bags have been so filled.

6. A machine according to claim 5 wherein said mechanical excavator is mounted on a prime mover which is arranged to draw said bag positioning means and said extraction means along a trench wherein said bags are to be positioned.

7. A machine according to claim 6 wherein said bag positioning means and said extraction means are drawn directly behind said prime mover such that in use said bags are positioned in the trench just excavated by said excavator.

8. A machine according to claim 5 wherein said bag positioning means comprises a platform supported at or below ground level on which an operator can stand in order to position bag and formers in a trench along which said bag positioning means is being drawn in use.

9. A machine according to claim 5 wherein said extraction means comprises a piston and cylinder assembly orientated with its axis in a generally vertical orientation and having former engaging means on the operatively lowest end thereof for engaging the formers to lift said formers out of the ground.

10. A machine according to claim 5 wherein a sloping guide track is mounted to said machine and slopes downwardly from said extraction means to said bag positioning means, said sloping guide track providing a facility whereby formers extracted by said extraction means can be returned to said bag positioning means by sliding down said guide track.

11. A machine according to claim 5 further comprising a frame on which said bag positioning means and said extraction means are mounted, wheels for supporting said frame in which a trench in which said bags are to be positioned, an endless chain movable on a track parallel with the direction of movement of the machine, said track including a lower section which is parallel with said trench, a plurality of formers connected to said chain and movable with said chain around said track, and drive means for driving said chain around said track in a direction and at a speed such that in use the portion of said chain travelling on said lower section is travelling in a direction which is opposite to the direction of movement of the machine and at a speed which is the same as that of the machine, the formers carried by said chain along said lower path being stationary relative to the ground and located within the trench over which said frame is being moved.

12. A machine according to claim 11 wherein said extraction means is formed by a generally vertical section of said track up which said chain travels in use.

13. A machine according to claim 11 wherein said endless chain is formed by two chain strands spaced apart by rods which connect the chain strands together, said formers being attached to said rods.

14. A machine according to claim 13 wherein the chain strands are formed of individual chain links and the ends of said rods are engageable and disengageable from said chain links such that the spacing between rods may be varied.

15. A machine according to claim 11 wherein an upper section of said track is substantially horizontal and a support surface is provided on said frame immediately below said upper section, said formers sliding on said support surface in use.

* * * * *